May 25, 1926.
H. DE F. MADDEN ET AL
1,585,905
GRID MAKING MACHINE
Filed Oct. 14, 1922     3 Sheets-Sheet 1
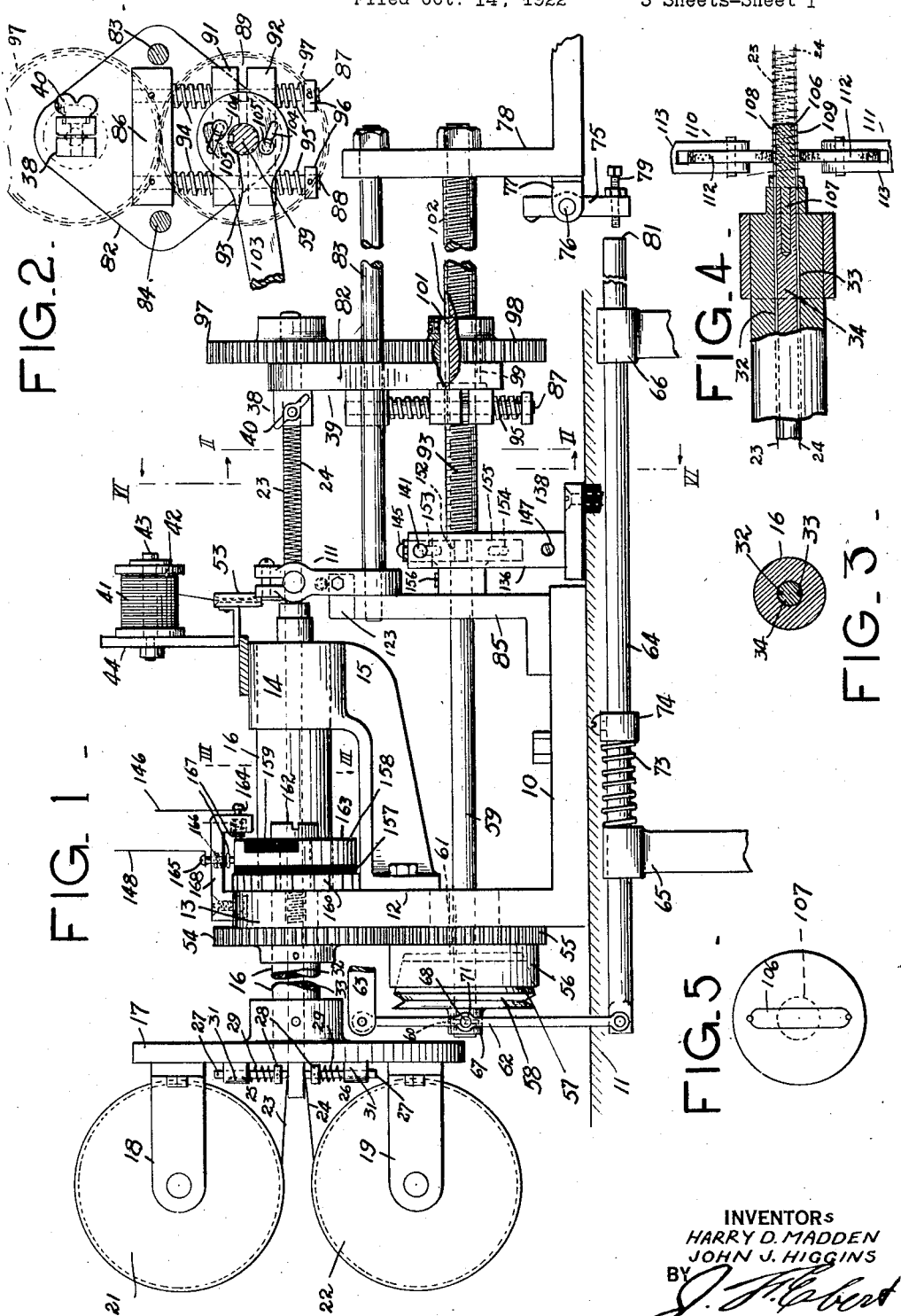
INVENTORS
HARRY D. MADDEN
JOHN J. HIGGINS
BY
ATTORNEY

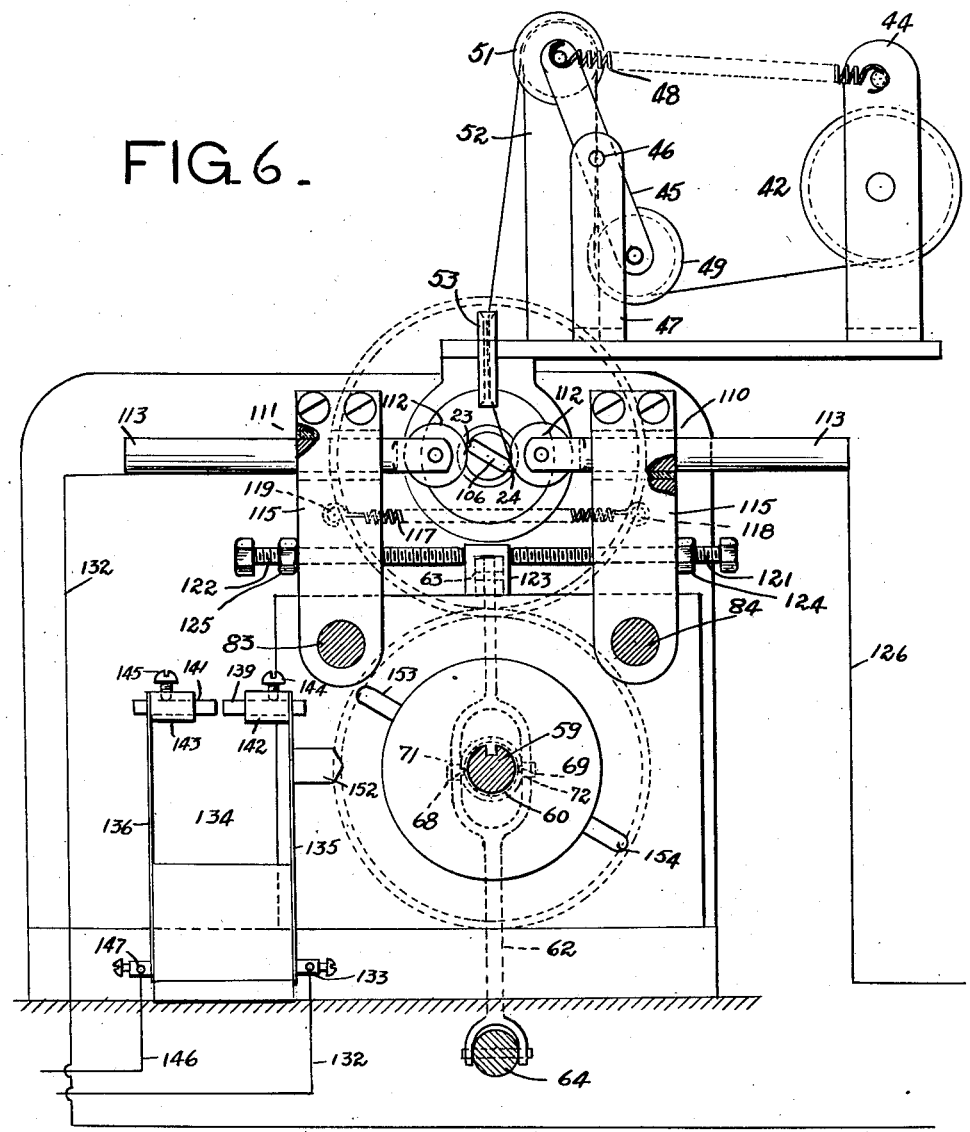

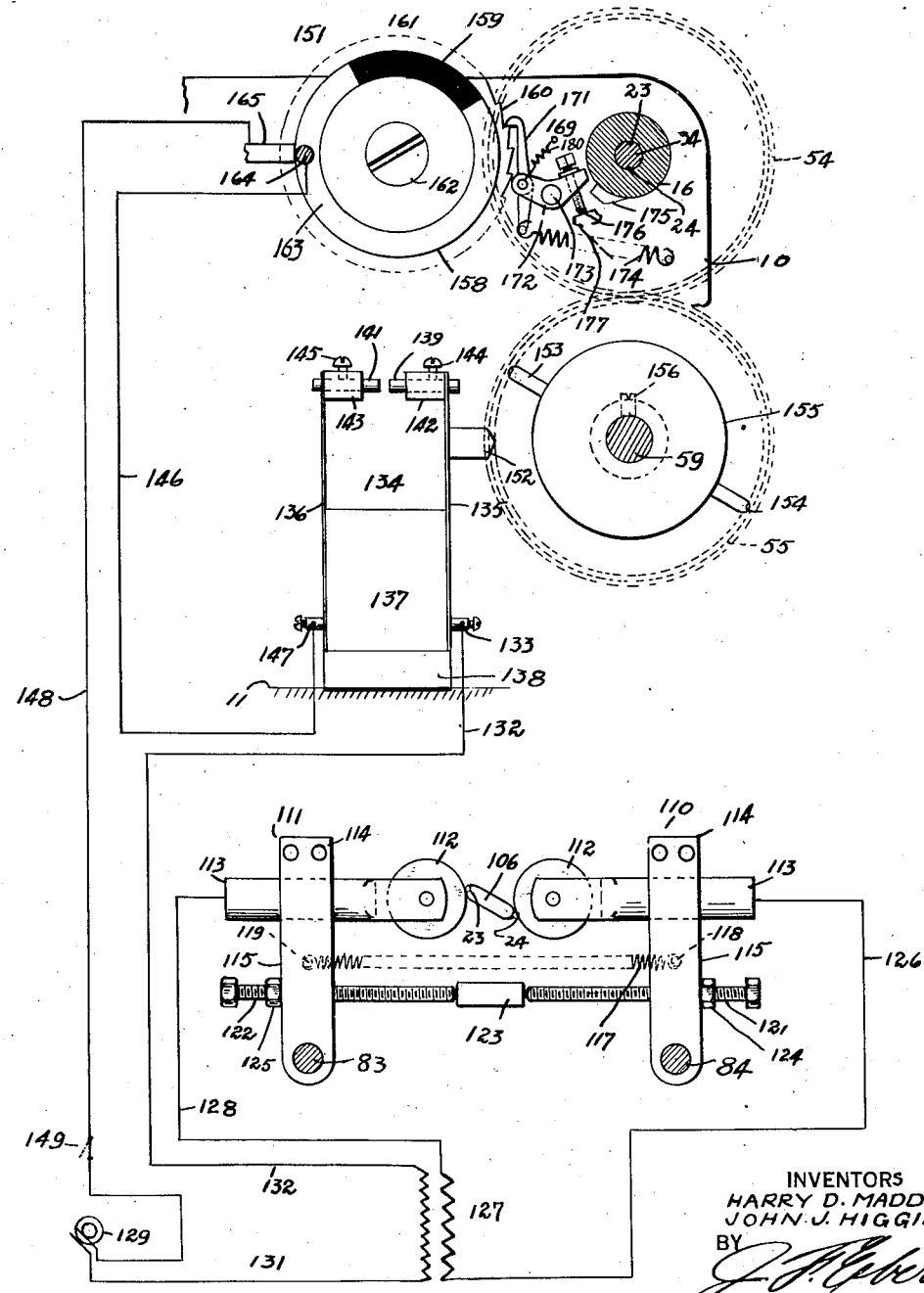

Patented May 25, 1926.

1,585,905

UNITED STATES PATENT OFFICE.

HARRY DE FOREST MADDEN, OF NEWARK, AND JOHN JOSEPH HIGGINS, OF EAST ORANGE, NEW JERSEY, ASSIGNORS TO WESTINGHOUSE LAMP COMPANY, A CORPORATION OF PENNSYLVANIA.

GRID-MAKING MACHINE.

Application filed October 14, 1922. Serial No. 594,495.

This invention relates to a machine for the manufacture of grids for electron-emission devices such as radiotrons and the like.

An object of the invention is to provide a machine which will operate automatically to produce a grid.

Another object of the invention is the provision of machine elements which will automatically wind a continuous strip adapted to be divided into sections for use as grids.

A further object of the invention is to wind automatically a wire helically about a plurality of supports maintained in a given relation.

Other objects and advantages will be apparent upon a reading of the following description.

A grid, as commonly employed as an element of a radiotron, consists of two relatively heavy wires or rigid members disposed in parallel relation and about which a comparatively fine or grid wire is helically wound and secured by rigidly uniting, as by hot pressing or welding, at the points of contact between the grid wire and the supports. A grid, when finished, thus appears in the form of a lattice work or cage in which another element, such as a filament, is subsequently disposed when the electron device has been completed.

It is desirable, however, to avoid welding the grid wire to the support wires for a given distance to leave free, at one end of the grid, two relatively short lengths of the support wires to provide projections or legs which are later secured, usually by welding, to leading-in wires which project from the press or other body portion of the device in which the grid is incorporated. The grid may thus be held in the desired vertical position, and the sections of the supports which are left bare may vary in their lineal dimension, depending upon the proportions of the device to which it is to be applied.

Heretofore, the manufacture of a grid has been a tedious and time-consuming operation. It was necessary to manually position the support wires in a holder after which the holder was manually operated and a wire wound about the supports; after which the supports were properly positioned and another manual operation was performed to spot weld the wire to the supports. The manual winding gave a non-uniform winding, and considerable shrinkage has often been caused by poor welds. It is well known that the welding operation is a delicate one and that, unless the proper time element is maintained during the welding operation, the wire will burn and become brittle, with detrimental results.

The present invention, therefore, aims to provide a machine which will automatically and uniformly wind and efficiently weld a plurality of grids in the form of a continuous strip, which strip may be cut into sections of the proper grid lengths. The strip may be termed a "grid strip" or a "grid blank" and the present invention may operate to alternately wind a plurality of turns of wire upon suitably positioned support wires and then operate to leave unwelded a given number of turns. It will, therefore, be seen that, when a strip is removed from a machine, the strip may be cut into grids or lengths which will include the proper number of turns of wire welded to support wires and a given portion of the supports free from welds to constitute the legs of the grid.

Our invention contemplates a machine which, after the proper positioning of the support wires, will operate to wind automatically a single grid or a continuous strip of grid material.

The time, as heretofore necessary for the manufacture of grids, is greatly reduced and, inasmuch as no human agency is concerned in the spacing of the turns about the support wires or in the welding operations, a more accurately wound and a more durable product is produced.

The objects of our invention may be accomplished by providing a machine adapted to receive and support, in parallel relation, two comparatively rigid members or support wires. The support wires may be fed from rollers and may pass through suitable guides and be secured by means of a clamp which, in conjunction with the guides, will maintain the support wires in parallel relation.

The clamp may be mounted on a suitable carriage associated with other machine elements which may be actuated to move the carriage to effect a rectilinear translation of the support wires at a given rate of speed. Initially, an end of a grid wire may be welded or otherwise secured to one of the support wires and the support wires may be rotated about a given horizontal axis during their rectilinear movement. The grid wire may be suitably guided to effect a helical winding thereof about the support wires during their rotary and rectilinear movement.

As the grid wire is wound about the supports, suitable welding jaws are provided to make contact with the wire at its points of contact with the supports. Thus, as the grid wire is wound about the support wires, it is simultaneously welded and thus secured to the support wires. A continued operation of the machine will produce a strip of grid material. For the purpose, however, of leaving given sections of the strip bare to provide the aforementioned grid-legs, mechanism may be provided for automatically breaking the welding-circuit at intervals after the winding of a given number of turns upon the support wires. This may be accomplished by a member which will automaticaly act to alternately break the circuit for a given time interval after each number of windings and make the circuit for another period.

The invention will be more fully understood by reference to the accompanying drawings, in which, Figure 1 is a side view, in elevation, of our machine, a portion of the upper structure being removed to better illustrate other parts;

Figure 2 is an end sectional view of the mechanism for locking the carriage to a driving-shaft as taken on line II—II in Figure 1;

Figure 3 is a transverse section of the shaft and support guide taken on line III—III in Figure 1;

Figure 4 is a fragmentary detail showing a plan view of a portion of the welding members and their relation to other elements which are shown partly in section;

Figure 5 is an enlarged end view of the arbor or extended portion of the guides in which the support wires are positioned;

Figure 6 is a vertical section taken on line VI—VI of Figure 1 and on a slightly larger scale;

Figure 7 is an end view, partly diagrammatic, showing the mechanism for making and breaking the circuit and also showing a skeleton arrangement of other elements and their relation to the electrical system.

The machine may include a right-angle bracket 10, one leg of which may be bolted to a suitable platform or table 11. The other or vertical leg 12 of the bracket may be provided with a bearing 13 in horizontal alignment with a supplemental bearing 14 integral with an arm 15 suitably bolted to the leg 12. Rotatably positioned in the bearings 13 and 14, is a shaft 16 having a disc or spool-carrier 17 secured to one end thereof which is provided with projecting bearings 18 and 19 for rotatably supporting spools 21 and 22. The spools 21 and 22 carry support wires 23 and 24 which may pass under tension members 25 and 26, respectively. The members 25 and 26 are alike and comprise rods 27 having collars 28 secured thereto and are normally urged toward the wires by springs 29 which are disposed between the collars 28 and bearings 31, secured to the disc 17 and in which the rods 27 are movable radially.

Suitable apertures or longitudinal passageways 32 and 33 are provided in the shaft 16 (see Figure 3) for the passage of the wires 23 and 24, respectively. The passage-ways 32 and 33 may be provided by grooving a rod 34 and fitting it into an axially disposed aperture in the shaft 16. The support wires, after passing through the shaft 16, may be secured in a clamp 38 of any suitable type provided with a thumb screw 40 and may be movable with a carriage 39 to be later described. Grid wire 41 may be carried on a spool 42 journaled on a shaft 43 which, in turn, may be secured to a bracket 44 fastened to the bearing 14.

As indicated in Figure 6, a device may be provided for maintaining a given tension of the grid wire as it is fed. Such device may comprise a rockable member 45 in the form of a double lever having its fulcrum at 46 in a standard 47. The upper arm of the lever 45 may be connected to the bracket 44 which carries the grid-wire spool 42 by a helical spring 48. Thus, the opposite arm of the lever 45 is free to be moved away from the spool 42, and a guide pulley 49 is journaled to this free arm, and the grid wire is led around the guide pulley 49 and over a stationary guide pulley 51 which is mounted on a post 52.

The standard 47 and the post 52, as well as the bracket 44, may be secured to any suitably positioned stationary portion of the structure. After leaving the guide pulley 51, the grid wire is led through an eyelet or guide 53 for winding about the support wires.

In order to more clearly show certain essential features of the invention, the tensioning device above described has been omitted in Figure 1, and the grid wire is shown as passing directly to the eyelet 53.

Before the machine is started, the grid wire may be secured in the clamp 38 or fastened to the support-wires. As will be presently described, the machine may be operated to rotate the support-wires as a unit and to effect their rectilinear translation, thereby producing a helical winding of the gird wire about the supports. For the purpose of rotating the support wires, shaft 16 is rotated through gear-wheels 54 and 55 which are in mesh. The gear-wheels 54 and 55 have equal pitch diameters to produce an equal number of revolutions in the shafts 16 and 59.

The gear 54 is secured to the shaft 16, and the driving gear 55 is journaled in the leg 12 of the bracket 10 and is provided with a conical socket 56 adapted to receive a conical friction member 57 which may be integral and rotatable with a sheave or pulley 58 and free to revolve on a horizontal shaft 59. The sheave 58 may be driven to rotate the shaft 59 by means of the friction-member 57 and conical socket 56. A key 61 is provided in the shaft 59 and is adapted to engage the member 56 and gear-wheel 55 in the usual manner; thus, the gear 55 may be driven to rotate the shaft 59.

Any suitable means may be employed for driving the friction member 57 as, for instance, a belt may engage the sheave 58 and a sheave on a suitable motor (not shown). It has been found preferable to employ a motor for driving the sheave 58, and a switch may be so positioned convenient to an operator that the machine may be started or stopped at will. The friction-member 57, being free upon the shaft 59, is slidable along the shaft and may be reciprocated to engage, or be disengaged from, the conical socket 56 and this is accomplished by an actuation of a lever 62 having its upper end pivoted to an arm 63 which may be integral with the arm 12 of the bracket 10. The opposite end of the lever 62 may be pivoted to a push-rod 64 disposed in guides 65 and 66.

For the purpose of producing a reciprocation of the friction member 57, it is provided with a hub 67 having a groove 60 in which are adapted to slide diametrically spaced lugs 68 and 69 (see Figures 1 and 6). The lugs 68 and 69 are fixed in apertures 71 and 72, suitably positioned intermediate the end of the lever 62. Thus, an oscillation of the lever about its pivot-point in the arm 63 will effect alternate engagement and disengagement of the friction member 57 and the conical socket 56 on the gear-wheel 55.

The friction member 57 is, however, normally maintained in engagement with the socket 56 through the action of the push rod 64 which is provided with a helical spring 73 disposed between the guide 65 and a collar 74 fastened to the rod 64. The expansive action of the spring 73 causes a longitudinal movement of or tension in the rod 64 and, consequently, causes the lever 62 to effect an engagement of the friction member 57 with the socket 56 on the gear-wheel 55.

Since the sheave 58 may be considered as continuously driven, it will be seen that the machine will operate until force is applied to push the rod 64 against the action of the spring 73. The rod 64 may be automatically actuated and, for this purpose, a member 75 is pivotally mounted by means of a pin 76, upon an extension 77 of a bracket 78 which may be supported by any suitable stationary portion of the machine. The pivoted member 75 is adapted to rest with its upper end free to be engaged by a moving element of the machine, while its lower end is provided with a set screw 79 to engage an end 81 of the rod 64.

As will be later described, after winding a grid-strip of a given length, one of the machine elements will engage the upper end of the member 75, causing the set screw 79 to engage the end 81 of the rod 64 and remove the friction member 57 from engagement with the socket 56 and gear-wheel 55, thereby terminating the operation of the machine.

From the foregoing, it will be evident that the support wires for the grids are rotated about a horizontal axis, their ends being secured by clamp 38 to the carriage 39 which draws the wires through the guides 32 and 33. The carriage 39 may comprise a carrier-plate 82 slidable upon horizontal guide rods 83 and 84 which are supported in apertures at the upper end of the bracket 78 and in a bracket 85.

Integral with the carrier plate 82 is a projection or guide block 86 to which is fastened two depending rigid rods 87 and 88 having slidably disposed thereon a gripping member 89 in the form of a locking-nut that comprises two engaging members 91 and 92. The members 91 and 92 are provided with facing threaded portions and are adapted to be moved into engagement with the driving shaft 93 by helical springs 94, disposed upon the rods 87 and 88 and between the lower surface of the projection 86 and the upper surface of the member 91. The lower member 92 is normally urged upwardly, for engagement with the threaded driving shaft 59, by springs 95 disposed upon the rods 87 and 88 between collars 96 and the member 92.

From the above it will be evident that, as the driving shaft is rotated, the screw threaded portion thereof will operate to drive the carriage 39 and thereby effect a rectilinear translation of the support wires 23 and 24.

Although the support wires may be effectively rotated by means of the meshing gear-wheels 54 and 55, an additional pair of gear-wheels 97 and 98 having equal pitch diameters are suitably mounted in bearings in the carrier-plate 82 to cause a rotation of the clamp 38 in synchronism with the rotation of the support wires. The gear-wheel 98, which transmits motion to the gear-wheel 97, is slidably disposed upon the threaded portion 93 of the driving shaft 59, a bushing 99 being provided with a feather 101 to cause rotation of the gear-wheel 98 with the driving shaft 59 but which will permit the carriage 39 to slide longitudinally of the machine when it is desired to return the carriage to its initial position, a slot 102 being provided in the driving shaft for the passage of the feather.

When the carriage 39 reaches the end of its longitudinal movement, the members 91 and 92 may be released from engagement with the threaded portion of the driving shaft 59. For this purpose, a lever 103, having slots 104 tangentially disposed therein, is movable about the driving shaft 59 and movably secured to the carrier-plate 82 by tap-bolts 105 screwed into the members 91 and 92. The shanks of the top-bolts are disposed in the above mentioned slots, so that an upward movement of the lever 103 will produce opposite vertical movements of the members 91 and 92, thereby releasing them from the threaded portion of the driving rod 59 to permit a return movement of the carriage 39.

For the purpose of providing a rigid support or anvil to sustain the grid wires and supports during the welding operation, an arbor 106 is provided (see Figure 4). The arbor 106 has a shank 107 which is tightly fitted in an aperture in the end of the rod 34, in which the grooves 32 and 33 are provided. The arbor 106 is also provided with grooves 108 and 109 and, when it is in the desired position, these grooves constitute continuations of the grooves 32 and 33, respectively. Thus, as the support wires 23 and 24 are thrust through the spindle 16 and are gripped by the clamp 38, they are adapted to lie in the grooves 108 and 109, respectively.

It has been found preferable to secure the grid wires to the supports by a welding operation, and mechanism for performing this operation may consist of a pair of oppositely disposed welding members 110 and 111 (see Figs. 6 and 7). Each of the members 110 and 111 may comprise a welding disc 112, mounted on a slidable arm 113 which is secured in a split bearing 114 at the upper end of an oscillatory member 115. The members 115 are pivoted on the rods 83 and 84 which also serve as guide members for the carriage 39.

The welding discs 112 are disposed at opposite sides of the mandrel 106 and, as the grid wire 41 is wound about the support wires 23 and 24 disposed in the grooves of the mandrel, the welding members or the discs 112 thereof, may be moved toward the horizontal axis about which the support wires rotate. Such movement may be produced by a suitable spring 117, having its respective ends secured to pins 118 and 119, each fastened in an arm 115. The spring 117, therefore, serves to continually urge the welding members toward the support wires. The movement of the arms may, however, be governed by any suitable stop members, such as set screws 121 and 122, which are positioned in threaded apertures in the oscillatory members 115 of the welding members 110 and 111. A suitable stop 123 is fastened to the bracket 85 and in the path of movement of the set screws 121 and 122 to limit the movement of the welding members, which movement may be conveniently adjusted by a manipulation of the set screws. Lock nuts 124 and 125 are provided to secure the set screws from accidental movement.

Since the jaws of the welding members are continually urged toward the supports, it will be understood that, as the supports, with the grid wire wound thereon, are rotated, the upper surface of such portions of the grid wire as are in contact with the supports will make contact with a welding jaw with each half rotation of the support wires. This contact will effect a welding of the wires to the supports by reason of the passage of an electrical current. The circuit and source of electricity will be hereinafter described.

As the support wires rotate, the points of contact between the grid wire and support wires receive a plurality of engagements with the welding discs, which results in a multiple action of the welding discs upon each of the points to be welded. It is obvious that the number of times each point receives the welding action will be governed by the thickness of the discs 112 at the perimeter thereof.

As shown in the drawing, the width of the welding jaws has such relation to the pitch of the wound wire that, with each welding operation, one disc may engage two points to be welded and the other disc one point. However, as the support wires are rotated, one of the two points which engage with one of the discs will be moved to engagement with the opposite disc, thus receiving a double welding action. If desirable, wider discs may be employed, in which case each point to be welded will make a plurality of engagements with each of the jaws until the rectilinear movement of the support wires is sufficient to move the grid wire from between the jaws.

This multiple welding action upon each point to be welded is of considerable advantage, inasmuch as the time during each welding may be greatly reduced and the possibility of burning the wires practically eliminated and a more uniform weld be obtained.

The electrical current for creating the necessary welding heat may be supplied in the usual manner. The welding member 110 may be connected by a lead 126 from the secondary of a transformer 127, and another lead 128 from the secondary may be connected to the welding member 111. A source of current may be provided by any suitable means as, for instance, the generator 129 connected to the primary of the transformer 127 by a conductor 131 from whence the circuit may continue through a conductor 132 which leads to, and is secured in, a binding post 133 of an intermittent circuit-breaker 134. The circuit-breaking device may be operated to make the circuit with every half turn of the support wires through the action of resilient members 135 and 136 which are fastened to a block 137 of any suitable insulating material and secured to a step 138 fastened to the table 11.

The upper or free ends of the members 135 and 136 are provided with adjustable contact rods 139 and 141, respectively, suitably positioned in guides 142 and 143, set screws 144 and 145 being provided for securing the rods in given positions. The resilient member 135 may be moved to make contact between the contact rods 139 and 141, as will presently be described.

When contact is made, current may flow by reason of a conductor 146 secured in a binding post 147 of the resilient member 136 and a conductor 148 which is connected to the generator 129. A suitable switch 149 may be provided for permanently breaking the circuit when desired. It will be noted that a make-and-break device 151 is disposed between the lines or conductors 146 and 148; the operation of this device being hereinafter described.

Referring to the intermittent circuit breaker 134, it will be noted that the resilient member 135 thereof, is provided with a lug 152, so disposed as to lie in the circular path of fingers 153 and 154 which project from the perimeter of a circular plate 155 that is fastened to the driving shaft 59 by a set screw 156. The fingers 153 and 154 are positioned in diametrically opposite relation and, since the driving shaft 59 rotates in synchronism with the rotation of the support wires, the fingers 153 and 154 make contact with the lug 152 to permit a flow of current with each half turn of the driving shaft and, consequently, with each half turn of the support wires. It will thus be evident that, by suitably positioning the plate 155, the circuit breaker may be actuated to cause the passage of electrical current with each contact between the welding jaws and the grid wires wound upon the supports, the circuit being broken after each welding operation. It will, therefore, be understood that, as the machine is operated and the grid wire is wound about the supports, a welding operation is effected with each contact between the grid wires and the welding jaws, and a continuous welding operation results.

It is, however, desirable, as above set forth, to avoid welding the wires to the supports for a given number of turns after each series of welded wires. For instance, it may be required to alternately make 18 welded turns and 10 unwelded turns. This may be accomplished by the provision of the make-and-break device 151 which comprises a disc 157 of insulating material, (see Figs. 1 and 7) which constitutes a backing for a metal annulus 158 having a segment 159 of non-conductive material embodied therein. The annulus and disc are suitably fastened to a ratchet wheel 160 and, as a whole, provide a rotatable member 161 which is movable about a tap bolt 162 screwed into the upper end of the bracket 10.

The metallic portion of the rotatable member 161 provides for the passage of current between the conductors 146 and 148 during the greater part of a complete rotation of the member. The conductor 146 may make connection with the vertical face 163 of the annulus 158 by a contact pin 164, and the conductor 148 may be connected to the periphery of the annulus by a contact pin 165. The contact pins are normally held in their proper relation to the annulus by means of helical springs 166 disposed between collars 167 and a bracket 168 which is suitably fastened to the upper end of the barcket 10. The contact pin 165 is so disposed as to be in constant engagement with the metallic portion of the annulus 158, whereas, the pin 146 is adapted to alternately engage the conductive and non-conductive portions of the annulus.

It will be evident that rotation of the annulus will result in a make-and-break of the circuit. It is, therefore, necessary to impart a cooperative movement to the annulus and this movement is produced by a ratchet mechanism 169 (see Fig. 7) which is operated by means of its association with the shaft 16.

The ratchet mechanism may comprise a pawl 171 pivoted at the end of one arm of a lever 172, this arm being, in turn, pivoted on a stud 173 secured in the bracket 10. One end of the pawl may be provided with the usual jaw for gripping a tooth of the ratchet wheel 160 and the other end may be connected to a spring 174 suitably fastened to the bracket 10. Thus, the jaw of the pawl is normally maintained in engagement with the ratchet wheel.

The arm of the lever 172, opposite to that which carries the pawl, is normally disposed in the path of a lug 175 which may be suitably secured to the shaft 16. Thus, as the shaft rotates, an engagement between the lug and the lever arm will cause a movement of the pawl to effect rotation of the ratchet wheel and, hence, the annulus will be moved a given number of degrees, depending upon the pitch of the teeth of the ratchet wheel. A set screw 176 is provided in the lever 172 and is adapted to make contact with a projection 177 of the bracket 10 to limit the movement of the pawl. A spring 180 secured to the pawl-carrying arm of the lever 172 and to the bracket 10 serves to return the pawl to operating position after engagement with a tooth of the ratchet-wheel.

It will be evident that, with each rotation of the shaft 16, the annulus 158 will be moved a given number of degrees. With each rotation of the shaft 16, one turn of wire will have been wound upon the support wires, therefore, current may be permitted to flow with the welding operation during a given number of rotative movements of the annulus, the sum of which may be equal to the desired number of wires to be welded in a series, whereupon, the insulator segment 159, being timed to pass beneath the contact pin 164, opens the circuit and, although a continuous winding operation is performed, the grid wires are left unwelded from the support wires. The number of wires left free depends upon the length of the segment 159.

In practice; assuming that the carriage 39 of the machine is in position, with the clamp 38 adjacent to the mandrel 106, the support wires 23 and 24, which are threaded through the guides, lie in the grooves 108 and 109 of the mandrel. The support wires may be projected until their ends are disposed between the jaws of the clamp 38 which is then closed by turning the nut 40. The grid wire 41 may then be threaded through the eyelet 53 and the end thereof secured to the support wires or the operator may hold the end during the first few turns until the welding jaws have secured one of the turns of the grid wire to a support. The motor which drives the friction member 57 may then be permitted to operate by means of a suitable switch (not shown).

The driving gear 55 is then rotated, motion being transmitted to the shaft 16 through the engagement of the gear 55 with the gear 54 and, since the driving shaft 59 is rotated with the driving gear 55, gear 98, keyed to the threaded portion 93 of the driving shaft 59, transmits motion by means of its engagement with gear 97 to the clamp 38. The gearing may be of a ratio of 1 to 1 to effect a synchronous rotation of the clamp 38 and the shaft 16, thus effecting a rotation of the support wires 23 and 24 while maintaining their parallel relation. As the support wires are rotated and the grid wire wound thereon, the carriage 39, upon which the clamp 38 is mounted, is moved longitudinally away from the arbor 106, thereby effecting an axial movement of the support wires.

Axial movement is produced by means of the locking nut 89 which normally engages the threads of the driving shaft 59. Thus, as the driving shaft rotates, the clamp 38 is moved at a predetermined rate of speed, depending upon the pitch of the threads and the rate of rotation of the driving shaft 59.

It will be understood that the pitch of the wound grid wire is governed by the relative rotary and straight-line movement of the support wires and that this pitch may be varied to a greater or lesser degree by a variation in the proportions and adjustments of the various machine elements. With each semi-rotation of the support wires upon which the grid wire is wound, the welding discs make contact with the grid wires at their bends or contact portions with the support wires. Since the welding members are resiliently retained, the impact of the support wires is sufficient to cause them to move in opposition to the spring 117, which will again effect their return from the next welding position.

After a given number of wires have been wound and welded, the ratchet mechanism 169 will have been actuated to bring the insulator or segment 159 beneath the contact pin 164. The welding circuit is then broken and, during the winding of a plurality of turns of grid wire, depending upon the length of the segment 159, no welding operation will take place and the wire will be unsecured to the supports for a given distance. This operation is caused after every given number of welds; that is, after each series of welded turns of wire, and thus, when the grid-strip is removed from the machine and cut into grids, the loose wire may be clipped from the free portions of the supports which will subsequently constitute the legs or projections by which the grid may be welded or otherwise secured in an electron device.

When the carriage 39 has reached the limit of its travel, a side of the gear 98 will engage with the upper end of the pivoted member 75 which will then be rocked to bring the set screw 79 in contact with the end 81 of the push rod 64. The push rod will then be moved in opposition to the spring 73, causing the lever 62 to move about its fulcrum and release the friction member 57 from the socket 56, thereby terminating the connection between the motor and the machine, which will thus be automatically stopped. The operator may then stop the motor by means of a suitable switch (not shown).

The grid strip may then be clipped at a point adjacent to the arbor 106. The clamp 89 may then be opened to release the grid which may be removed and subsequently cut into the proper sections for use in electron-emission devices.

The lever 103 (Fig. 2) may be actuated to release the locking nut from engagement with the threaded portion 93 of the shaft 59 and the carriage be moved to a position adjacent the arbor 106. The ends of the new portions of the support wires may then be inserted between the clamp 38 which may then be closed.

It is evident that, after starting the winding of the first grid-strip by either temporarily holding or winding the grid wire upon one of the support wires, such manual operations are unnecessary in the subsequent production of grid-strips, since a finished portion of the grid is always in the machine.

The movement of the carriage 39 toward the arbor effects a release of the push rod 64, and the friction member 57 automatically engages the socket 56 and, therefore, when the operator has clamped the ends of the support wires, the motor may be started, with the result that the machine repeats the operation of winding a grid-strip as above described.

By the provision of a machine which will automatically wind and weld grid wire to supports, considerable advance in the art has been made. The rate of production has been greatly increased, and the strain and multiplicity of operations, as heretofore necessary to manually produce a grid, have been eliminated.

Although we have described a preferred embodiment of our invention, it is to be understood that other modifications may be made therein without departing from the spirit and scope of the appended claims.

What is claimed is:

1. A machine for making grids for electrical devices, comprising support-wire-feeding means, an arbor, means for holding support wires upon said arbor, means for winding another wire around portions of the support wires upon said arbor and means for effecting a relative movement between said arbor and the support wires held thereon.

2. A machine for making grids for electron-emission devices comprising means for automatically feeding support wires, means for winding a grid wire therearound, means for alternately welding a series of turns of said grid wires to said support wires and for leaving a series of turns of said grid wires unwelded.

3. A machine for making grids for electrical devices comprising an arbor, means for holding support wires in slidable contact with said arbor, means for winding a grid wire about the support wires, means for sliding said support wires along said arbor during the winding of the grid wire and means for securing said wound wire to said support wires.

4. A machine for making grids for electron-emission devices comprising an arbor positioned to receive a support-wire, means for feeding the support wire for movement over said arbor, means for winding a grid wire about said support wire while moving over the arbor and means for securing said grid wire to said support wire.

5. A machine for making grids for electron-emission devices comprising an arbor positioned to receive a support-wire, means for feeding the support wire for movement over said arbor, means for winding a grid wire about said support wire while the latter is moving over the arbor and means for securing the grid wire to the support wire by heating and compressing the wires together.

6. A grid-making machine comprising a support-member, means for disposing support-wires on said support-member, means for winding a grid wire around said support-member and support wires, means for securing the grid wire to the support-wires to provide a grid structure and means for automatically moving said grid structure relative to said support-member.

7. A grid-making machine comprising a support-member, means for disposing a support-wire on said support-member, means for winding a grid wire around said support-wire and said support-member, means for securing said grid wire to the support-wire to provide a grid structure and means for automatically moving said grid structure relative to said support-member.

8. A grid-making machine comprising an arbor, means for disposing a support-wire in close relation to said arbor, means for winding a grid wire about said support-wire and arbor, means for changing the relative positions of said support-wire and said arbor during the winding operation and means for securing the grid wire to the support-wire to provide a grid structure.

9. A grid-making machine comprising an arbor, said arbor being shaped to receive support-wires, means for winding a grid wire about support-wires disposed upon said arbor, means for moving the support-wires along the arbor and means for securing the grid wire to the support-wires.

10. A grid-making machine comprising an anvil, means for holding support-wires upon said anvil, means for winding a grid wire about said support-wires, a member for pressing said support-wires between the grid wire and said anvil to secure the wires together to provide a grid structure and means for moving the grid structure relative to said anvil.

11. A machine for making grids for electron-emission devices comprising an arbor, for holding a plurality of support wires in a fixed relation, means for rotating the support wires and arbor as a unit and means for causing a rectilinear translation of said support wires relative to said arbor and means for winding a grid wire about said support wires.

12. A machine for making grids for electron-emission devices comprising an arbor, means for holding a plurality of support wires in parallel relation and contiguous said arbor, means for rotating the support wires as a unit and means for causing simultaneously their rectilinear translation from said arbor, means for winding a wire about said support wires and means for automatically welding said wire to said support wires at a plurality of points of contact between said wire and said support wires.

13. A machine for making grids for electron-emission devices in a continuous strip comprising means for holding support wires, means for winding a grid wire about said support wires, means for changing the relative positions of said support wires and said grid wire during the winding operation, means for welding said grid wire to said support wires to secure a plurality of sections of wire to said supports, means for terminating the welding operation to leave a plurality of sections of wire unsecured to said supports and means for alternating the last mentioned operations to produce a grid strip adapted to be divided into sections suitable for use in electron-emission devices.

14. A machine for making grids for electron-emission devices in a continuous strip comprising means for holding support wires, means for winding a grid wire about said support wires, means for changing the relative positions of said support wires and said grid wire during the winding operation, means for alternately welding and not welding a given number of sections of wire wound about said support wires to produce a continuous grid adapted to be cut into sections for use in electron-emission devices.

15. A machine for making grids for electron-emission devices comprising a rotatable support, means for holding support wires, means for feeding said support wires to said rotatable support, means for holding grid wire, means for causing a relative movement of said support wires and said grid wire to effect a winding of said grid wire about said support wires, welding members disposed on opposite sides of said support, means for automatically performing a plurality of welding operations at each of a plurality of points of contact between said grid wire and said support wires and means for moving said welded wires from said support.

16. A machine for making grids for electron-emission devices comprising a support, support-wire holders and grid-wire holders, means for feeding support wires to said support, means for effecting a continuous change in the relative position of said holders to wind a grid wire about support wires, means for automatically welding said grid wire to said support wires, said welding means comprising a pair of oppositely disposed welding members in operable relation to said support, means for actuating said welding members to perform a plurality of welding operations upon said grid wire at each of a plurality of points of contact with said support wires and means for moving said welded wires from said support.

17. A machine for making grids for electron-emission devices comprising an anvil, support-wire holders and grid wire holders, means for feeding support wire to said anvil, means for automatically effecting a continuous change in the relative position of said holders to apply a grid wire to support wires, a pair of welding members disposed at opposite sides of said anvil, means for automatically operating said members to weld said grid wire to said support wires and means for moving said welded wire from said anvil.

18. A machine for making grids comprising an arbor, means for holding support-wires against said arbor, a movable pressure-member, means for winding a grid wire upon portions of support-wires disposed on said arbor, means for actuating said pressure-member to compress contacting portions of the wires, means for heating the wires during said pressure to secure the contacting portions and provide a grid structure and means for automatically moving said structure relative to said arbor.

19. A machine for making grids for electron-emission devices comprising a rotatable support, means for holding support wires longitudinally of said support, means for winding wire substantially transversely about said rotatable support and longitudinally disposed wires, means for welding said wires together and means for automatically moving said wires relative to said support.

20. A machine for making grids for electron-emission devices comprising an arbor, means for feeding support wires to said arbor, means for winding a grid wire about said support wires, a pair of welding members disposed at opposite sides of said arbor, means for producing a relative movement of said members and said support wires to effect a plurality of welding engagements at each of a plurality of points of contact between said grid wire and said support wires.

21. A machine for making grids for electron-emission devices comprising an arbor, means for feeding support wires to said arbor, means for winding a grid wire about portions of said support wires disposed on said arbor, means for changing the relative positions of said grid wire and said support wires during the winding operation, a welding member disposed in operative relation to support wires fed to said arbor and means for actuating said member to weld said grid wire to said support wires.

22. A machine for making grids for electron-emission devices comprising an anvil, means for feeding support wires to said anvil, means for automatically winding a grid wire about said support wires, an oscillatory welding member disposed in operative relation to said anvil and means for actuating said member to weld said grid wire to said support wires.

23. A machine for making grids for electron-emission devices comprising an arbor, means for feeding support wires to said arbor, means for winding a grid wire about said support wires, means for changing the relative position of said grid wire and said support wires to produce a helical winding of said grid wire, a pair of oscillatory welding members disposed in operative relation to said anvil and means for automatically actuating said members to perform a welding operation with each of a succession of half turns of said grid wire.

24. A machine for making grids for electron-emission devices comprising an arbor, means for holding a plurality of support wires in a fixed relation on said arbor, means for rotating the support wires as a unit, means for simultaneously causing their rectilinear translation from said arbor, means for winding a grid wire about said support wires, a pair of welding members disposed in operative relation to said support wires and means for actuating said welding members to weld said grid wire to said support wires.

25. A machine for making grids for electron-emission devices comprising a support, means for holding a plurality of support wires in fixed parallel relation upon said support, means for rotating the support and wires thereon as a unit and simultaneously causing the rectilinear translation of said support wires from said support, means for winding a grid wire about said support wires, a plurality of welding members disposed in cooperative relation to said support wires, means for actuating said welding members to effect a plurality of welding engagements at each point of contact between said grid wire and said support wires.

26. A machine for making grids for electron-emission devices in a continuous strip, comprising supporting means for holding support wires, means for winding a grid wire about said support wires, means for changing the relative positions of said support wires and said grid wire during the winding operation, a pair of welding members disposed in operative relation to said support wires, means for intermittently operating said welding members to secure contacting portions of said grid wire to said support wires and means for removing said wires from said supporting means.

27. A machine for making grids for electron-emission devices in a continuous strip comprising means for holding support wires, means for winding grid wire about said support wires, means for changing the relative positions of said support wires and said grid wire, a pair of welding members disposed in operative relation to said support wires, means for intermittently operating said members to alternately weld a series of turns of said grid wire to said support wires and leave unwelded a series of said turns.

28. A machine for making grids for electron-emission devices comprising a member for holding support wires, means for feeding grid wire, means for causing a relative movement of said support wires and said grid wire to effect a winding of said grid wire about said support wires, welding members disposed in cooperative relation to said wound wire, means for intermittently engaging said grid wire with said welding members, means for effecting an electrical circuit through said wire, welding-members during each of said engagements and means for breaking said circuit when said welding members and said wires are disengaged and means for removing said welded wire from said member.

29. A machine for making grids for electron-emission devices comprising means for holding support wires, means for holding grid wires, means for causing a relative movement of said support wires and said grid wire to effect a winding of said grid wire about said support wires, a pair of welding members disposed in operative relation to said wound wire, means for intermittently engaging said welding members with said wire, means for causing the passage of an electrical current during each engagement, means for breaking said current when said welding members and wires are disengaged and means for automatically causing the said welding members to alternately weld a series of turns of said grid wire to said supports and leave unwelded a plurality of turns of said wire.

In testimony whereof, we have hereunto subscribed our names this 13th day of October 1922.

HARRY DE FOREST MADDEN.
JOHN JOSEPH HIGGINS.